June 1, 1954  G. B. HILL  2,679,873
KNIFE MOUNTING FOR FORAGE CHOPPERS
Filed May 17, 1951  2 Sheets-Sheet 1
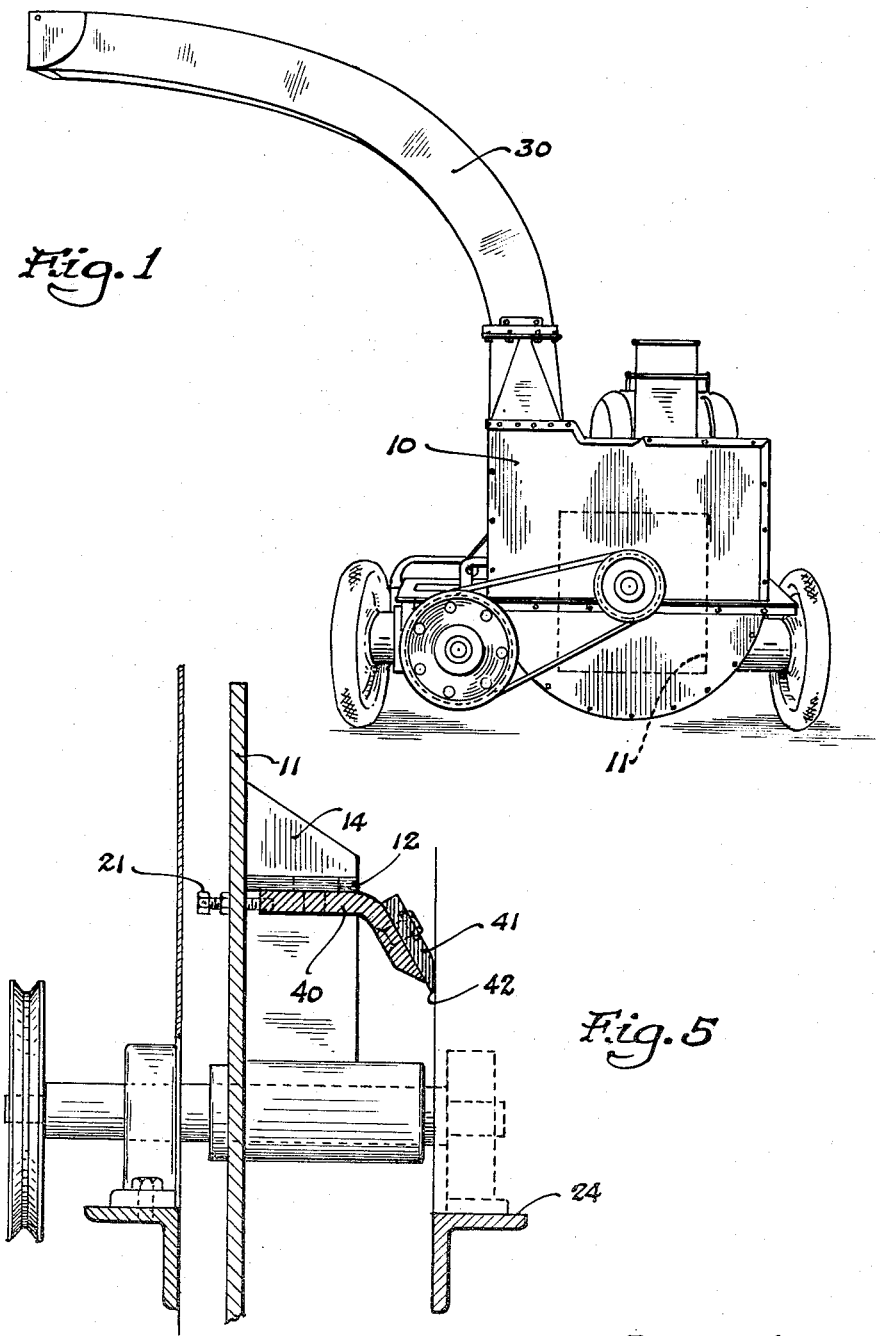
Inventor
George B. Hill
By Allan R. Redrow
Attorney

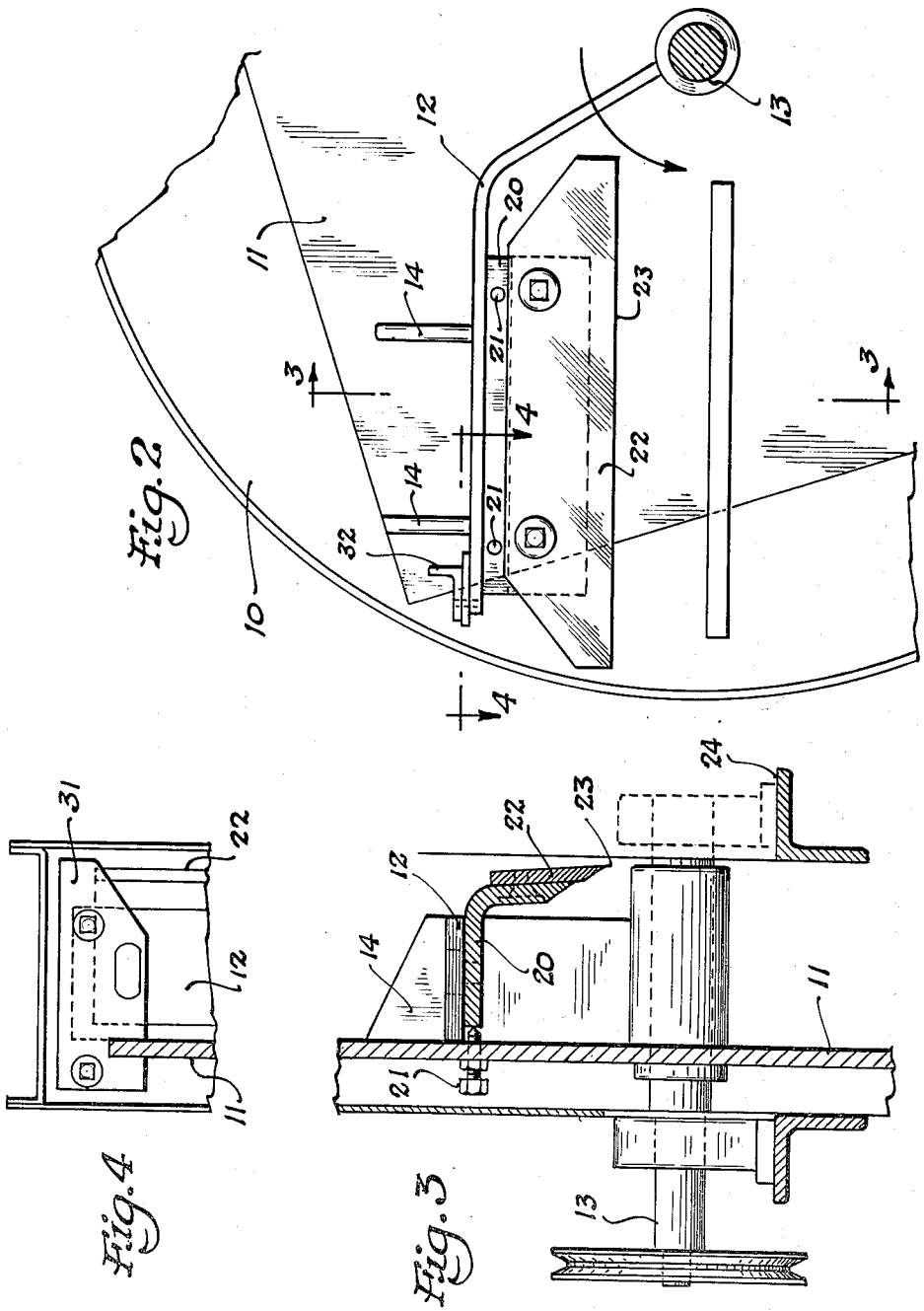

Patented June 1, 1954

2,679,873

UNITED STATES PATENT OFFICE 2,679,873

KNIFE MOUNTING FOR FORAGE CHOPPERS

George B. Hill, New Holland, Pa., assignor to The New Holland Machine Division of the Sperry Corporation, New Holland, Pa., a corporation of Delaware Application May 17, 1951, Serial No. 226,887

3 Claims. (Cl. 146—107)

This invention relates to a comminuting means and more particularly to a knife mounting means for a forage chopper or the like.

In certain of the conventional forage harvester machines, a relative heavy flywheel is made to rotate in a closed housing and suitable straight edge knife means are mounted fixedly on the flywheel to be carried past an anvil so that hay or corn stalks or the like may be fed into the casing so as to be cut into short lengths as the knife means move pass the anvil. A plurality of knife edges are carried on the flywheel and the length of the cut is controlled by the speed of the feeding the material, the number of knives mounted on the flywheel face, and the R. P. M. of the flywheel. At the periphery of the flywheel suitable paddles are provided to sweep the cut material around the housing until it can be thrown from the casing into a tangentially disposed spout which delivers the cut material into a suitable collecting means.

The present invention is concerned with an improved mounting for the knife means carried on the flywheel. The knife edges are carried on suitable support means that may be adjusted in and out with respect to the surface of the flywheel so as to control the position of the knife with respect to the anvil. In addition, the knife mounting means and the rib structure from which the knife is mounted, forms a continuous and relatively smooth solid surface to not only serve as a fan blade to produce a draft of air through the housing and spout to assist in the delivery of the cut material from the housing and into the storage receptacle, but also the solid structure is provided to assist the delivery of the cut material out to the periphery of the housing by providing a smooth surface over which the material may slide as it is thrown out centrifugally.

The knife blades may be mounted on the adjustable carrying means in several ways and in the preferred form of the invention, the knife is mounted on the adjustable means so as to be self-sharpening.

The paddle means likewise may be adjustably or removably mounted on the flywheel as will appear more fully in the specification below.

In the drawings, Figure 1 is a rear perspective view of a forage harvester of the type making use of a rotating flywheel type of cutter;

Figure 2, is a front elevation of the machine partly broken away to show one modification of the mounting for a knife blade on the face of the rotating flywheel;

Figure 3, is a view taken on the line 3—3 of Figure 2;

Figure 4, is a view taken on line 4—4 of Figure 2; and

Figure 5, is a view similar to the view shown in Figure 3 disclosing the preferred form of the knife mounting means.

The knife mounting structure of the present invention may be used on the type of forage harvester disclosed in the patent to Sensenig No. 2,402,849 granted June 25, 1946 and in this type machine, a housing 10 is provided for enclosing a rotating flywheel 11 that is driven by suitable means either from the tractor or from a motor carried on the frame of the forage harvester.

The flywheel 11 rotates within the housing 10 and has a rib 12 on its front surface, the rib being formed of relatively thin but stiff strip material that is shaped as shown in Figure 2. The rib 12 is preferably welded to the surface of the flywheel 11 by being connected to the hub 13 at the center of the flywheel and extends outwardly therefrom in a generally curved direction toward the periphery of the flywheel. The rib is backed up by the braces 14 which may also be welded integral with the flywheel surface and the rib. It will be noted that the rib 12 provides a continuous solid surface extending from the center portion of the flywheel outwardly toward the periphery of the surface upon which it is fixed.

On the underside of the rib 2, referring to Figures 2 and 3, there is fixed a bar element 20 having a generally angular cross-sectional shape and the bar being mounted on the rib to extend generally longitudinally thereof. The bar 20 may be bolted to the rib 12 but is designed to be carried on the rib in a manner to be adjustable toward and away from the surface of the flywheel by means of a plurality of adjusting screws 21 carried on the flywheel. The bar 20 is mounted with one leg of its angle flush against the forwardly moving surface of the rib 12 as best seen in Figure 3 and the other leg of the cross-section, carries a knife blade 22 having a sharpened edge 23 which cooperates with anvil 24 carried in a fixed position on the frame of the machine. It is obvious that as the flywheel rotates in the direction of the arrow as shown in Figure 2, that the edge 23 of the knife will pass the anvil and thus sever any crop material that is positioned over the anvil and extending into the housing.

A number of ribs 12 may be mounted on the flywheel and preferably four such ribs are provided. In normal use four knife blades are provided, one each being carried on each of the ribs 12 and a suitable length of cut of either the corn stalk or hay material is produced as material is fed into the housing by means of a conventional infeed conveyor mechanism such as is shown in the Sensenig patent and which lifts the crop from the field for delivery into the housing.

As the crop is cut at the anvil, the severed lengths fall onto the flywheel or onto the angular member 20 and are slung outwardly by centrifugal force across the smooth surfaces of the bars 20 and ribs 12 to the periphery of the casing. The paddles then sweep the cut material around the inside of the housing to forcibly throw it upwardly through the outlet chute 30 which feeds the material into a suitable collection means.

To assist in the feeding action and to effect delivery of the cut crop out of the spout 30, a paddle 31 may be removably mounted on the end of the rib 12 to serve as a sweeper member to clear out all the material that falls off the end of the rib 12 and might otherwise tend to collect in the housing. The paddles 31 carried at the ends of each of the ribs 12 in conjunction with the cut crop material, serve also to push the air around in the casing at the outer edge and thus create a draft that tends to assist in the fluffy delivery of the material out of the spout 30.

The paddle 31 is removably bolted to a support angle 32, see Figure 2, that is mounted integral with the periphery of the flywheel as is clearly shown in Figure 2. The paddle 31 is adjustably mounted with respect to the support bracket 32 so that it can be made to more or less closely follow the periphery of the housing as may be found necessary in handling crops of different kinds.

As shown in Figure 3 the knife element 22 is carried on a bar member 20 that has a cross-section that is approximately a right angle so that the knife 22 passes in front of the anvil with a good solid motion. This has been found to serve particularly well in severing heavy materials such as corn stalks and the like.

In cutting somewhat more fluffy material and a crop in which the stems are not so thick, a preferred construction as shown in Figure 5 may be used. In this form of the invention, the bar 40 for supporting the knife 41 is formed to have a cross-sectional shape that is more of an obtuse angle. The knife 41 may be mounted on the front surface of the bar member 40 so that the leading edge 42 of the knife is made to pass closely adjacent the anvil 24. It will be noted, however, that the knife blade 41 is turned over with respect to the position of the knife shown in Figure 3. In this mounting of the knife blade, the blade is automatically sharpened as it passes the anvil. The wear across the surface of the blade is somewhat uniform and as the blade wears down the cutting edge 42 is preserved so that it has a longer life. In the structure shown in Figure 5, the support bar 40 may be adjusted in and out in a manner similar to the structure shown in Figure 3, by means of a plurality of the adjusting screws 21.

The knife structure shown in Figure 5 otherwise operates identically with the operation of the structure shown in Figure 3 and no further explanation is required.

It is apparent, that many modifications of the invention claimed herein may occur to those skilled in the art, which may fall within the scope of the following claims.

I claim:

1. A forage chopper and blower comprising a flywheel, a plurality of knife supporting brackets mounted on said wheel for linear adjustment in an axial direction thereon, means permanently fixed on said wheel for supporting and guiding said knife supporting brackets in their linear axial adjustment, means threaded through said flywheel parallel to the axis thereof and in endwise engagement with said brackets for effecting axial adjustment thereof relative to said fixed supporting and guiding means, and knives carried by the respective brackets with the cutting edges of said knives extending generally radially of the flywheel and in its direction of rotation.

2. A forage chopper and blower comprising a flywheel, a knife supporting bracket mounted on said flywheel for linear adjustment in an axial direction thereof, means permanently fixed on said wheel for supporting and guiding said knife supporting bracket in its linear axial adjustment, means threaded through said flywheel parallel to the axis thereof and in endwise engagement with said bracket for effecting axial adjustment thereof relative to said fixed supporting and guiding means, and a knife carried by said bracket with its cutting edge extending generally radially of the flywheel and in the direction of rotation thereof.

3. A forage chopper and blower comprising a flywheel, a knife supporting bracket mounted on said flywheel for linear adjustment in an axial direction thereon, a rib permanently fixed on said flywheel for supporting and guiding said knife supporting bracket in its linear axial adjustment, and means threaded through said flywheel parallel to the axis thereof in endwise engagement with said bracket for effecting axial adjustment thereof relative to said fixed supporting and guiding means, said rib extending generally radially of the flywheel and functioning also as a fan blade.

References Cited in the file of this patent

UNITED STATES PATENTS

| Number | Name | Date |
| --- | --- | --- |
| 92,342 | Newton | July 6, 1869 |
| 1,247,307 | Merwin | Nov. 20, 1917 |
| 1,249,020 | Bullock | Dec. 4, 1917 |
| 1,327,346 | Merwin | Jan. 6, 1920 |
| 1,461,764 | Silver | July 17, 1923 |
| 1,793,476 | Gehl | Feb. 24, 1931 |
| 2,115,234 | Preston | Apr. 26, 1938 |
| 2,235,919 | Dion | Mar. 25, 1941 |
| 2,298,482 | Holland-Letz | Oct. 13, 1942 |
| 2,312,612 | Wetmore | Mar. 2, 1943 |